(12) United States Patent
Takano et al.

(10) Patent No.: US 6,732,605 B2
(45) Date of Patent: May 11, 2004

(54) BEVEL GEAR

(75) Inventors: Hiroshi Takano, Yokohama (JP);
Yujiro Ohara, Kamakura (JP); Hiroshi Yamashita, Yokohama (JP); Atsushi Hayata, Hadano (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/090,794

(22) Filed: Mar. 6, 2002

(65) Prior Publication Data

US 2002/0148316 A1 Oct. 17, 2002

(30) Foreign Application Priority Data

Mar. 30, 2001 (JP) .................................. 2001-098710

(51) Int. Cl.[7] .............................................. F16H 55/22
(52) U.S. Cl. ........................................ 74/459.5; 74/457
(58) Field of Search .................................. 74/457, 459.5

(56) References Cited

U.S. PATENT DOCUMENTS

| 2,285,575 A | 6/1942 | Elbertz | |
| 2,436,276 A | * 2/1948 | Whildhaber | 74/459.5 |
| 2,778,240 A | * 1/1957 | Prester | 74/459.5 |
| 6,129,793 A | 10/2000 | Tan et al. | |
| 6,324,931 B1 | * 12/2001 | Tsung | 74/459.5 |

FOREIGN PATENT DOCUMENTS

| GB | 706 080 | 3/1954 |
| JP | 9-323219 | 12/1997 |

OTHER PUBLICATIONS

Katsuo, "Webbed Bevel Gear," Patent Abstracts of Japan, vol. 012, No. 495, Dec. 23, 1988, JP 63 215329, Sep. 7, 1988, 1 Sheet, Abstract.

* cited by examiner

Primary Examiner—William C. Joyce
(74) Attorney, Agent, or Firm—Foley & Lardner LLP

(57) ABSTRACT

A bevel gear 1 has a radius of curvature R of a fillet curve provided between a tooth flank A and a bottom land B gradually increasing from a small-diameter end D1 to a large-diameter end D2.

9 Claims, 5 Drawing Sheets

BEVEL GEAR

BACKGROUND OF THE INVENTION

This invention relates to a bevel gear for use in power transmission devices in a variety of machinery, and more particularly, to a bevel gear suited for use in automotive differential gearing.

Straight bevel gears and spiral bevel gears are generally manufactured by preparing a gear material 100 as shown in FIG. 1A by forging or machining, and then forming a tooth 101 in the material 100 by cutting as shown in FIG. 1B, resulting in a bevel gear 102 as shown in FIG. 1C. These bevel gears can also be produced by electric discharge machining (not shown) as disclosed in Japanese Patent Laid-Open Publication No. HEI-9-323219. The tooth 101 of the bevel gear 102 is shaped to gradually increase in dimensions from a small-diameter end to a large-diameter end. However, a fillet curve between a tooth flank A of the tooth 101 and a bottom land B has a radius of curvature R being identical from the small-diameter end to the large-diameter end (See cross-sectional views of FIG. 1D and FIG. 1E, illustrating the small-diameter end and the large-diameter end, respectively). A radius of curvature R of the fillet curve depends on a radius of curvature R at the small-diameter end for providing good meshing with a mating gear.

SUMMARY OF THE INVENTION

This kind of related bevel gear faces, however, a problem described below when used in automotive differential gearing. That is, the bevel gear used in automotive differential gearing is adjusted to contact at its teeth a mating gear at a position close to the large-diameter end with a larger tooth width, so as to deal with the power transmission load. This causes the gear to be likely to break at the dedendum of the large-diameter end because of the small radius of curvature of the fillet curve depending on that of the small-diameter end. To prevent such breakage, it is necessary to disadvantageously use a large-sized bevel gear for obtaining required strength. This has been a problem to be solved.

This invention was made with the above problem in mind, and has an object of providing a bevel gear having sufficient strength from a small-diameter end to a large-diameter end.

In order to achieve the above object, a bevel gear according to this invention has a radius of curvature of a fillet curve between a tooth flank and a bottom land at a large-diameter end made greater than that at a small-diameter end.

According to this invention, a radius of curvature at a large-diameter end is made greater than that at a small-diameter end, increasing the strength of the large-diameter end which is otherwise likely to be broken, and thereby achieving sufficient, even strength from the small-diameter end to the large-diameter end. This enables reduction in size of the bevel gear and thus the reduction in size of a transmission device including the bevel gear, leading to reduction in cost thereof.

DETAILED DESCRIPTION OF THE PREFERRED EMBODIMENT

With reference to the accompanying drawings, a bevel gear according to one embodiment of this invention will be described below.

Figure 1A:
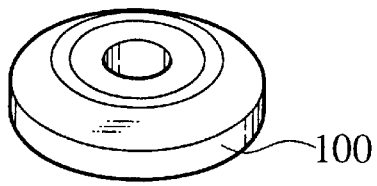
FIG. 1A is a perspective view of a gear material prepared in the process of manufacturing a conventional bevel gear.
Figure 1B:
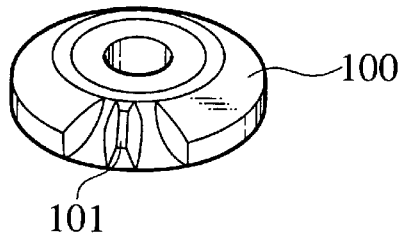
FIG. 1B is a perspective view illustrating a tooth formed by cutting in the gear material.
Figure 1C:
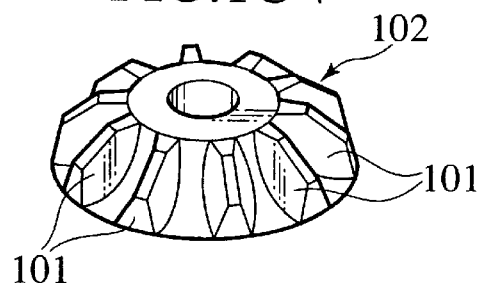
FIG. 1C is a perspective view of a completed bevel gear.
Figure 1D:
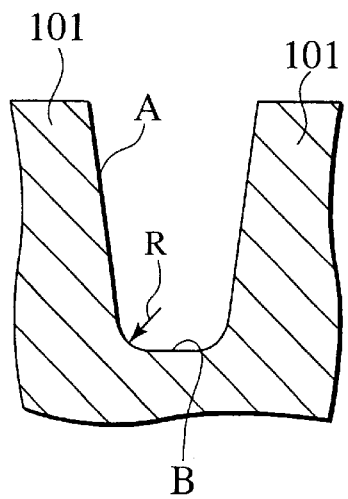
FIG. 1D is a cross-sectional partial view of a small-diameter end of the bevel gear shown in FIG. 1C.
Figure 1E:
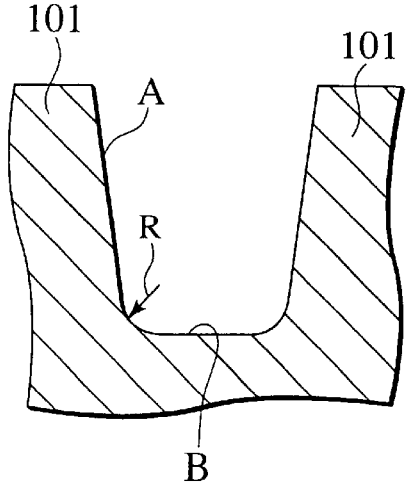
FIG. 1E is a cross-sectional partial view of a large-diameter end of the bevel gear shown in FIG. 1C.
Figure 2A:
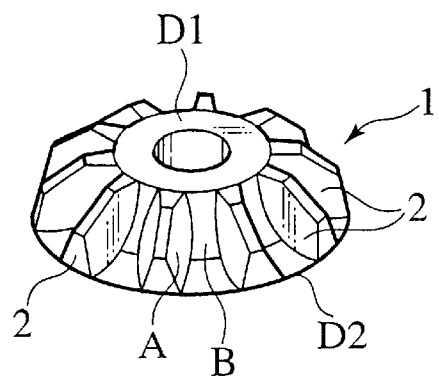
FIG. 2A is a perspective view of a bevel gear according to this invention.
Figure 2B:
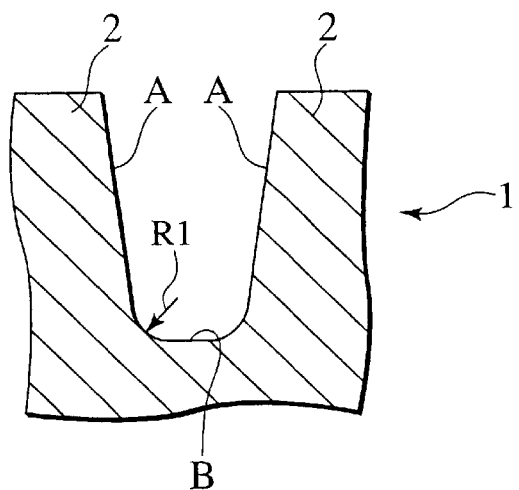
FIG. 2B is a cross-sectional partial view of a small-diameter end of the bevel gear according to this invention.
Figure 2C:
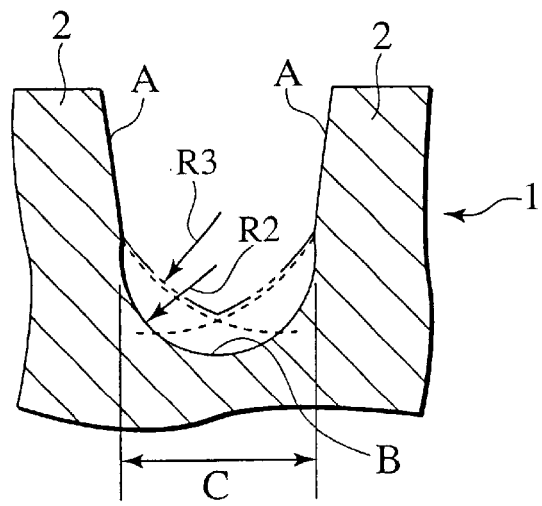
FIG. 2C is a cross-sectional partial view of a large-diameter end of the bevel gear according to this invention.
Figure 2D:
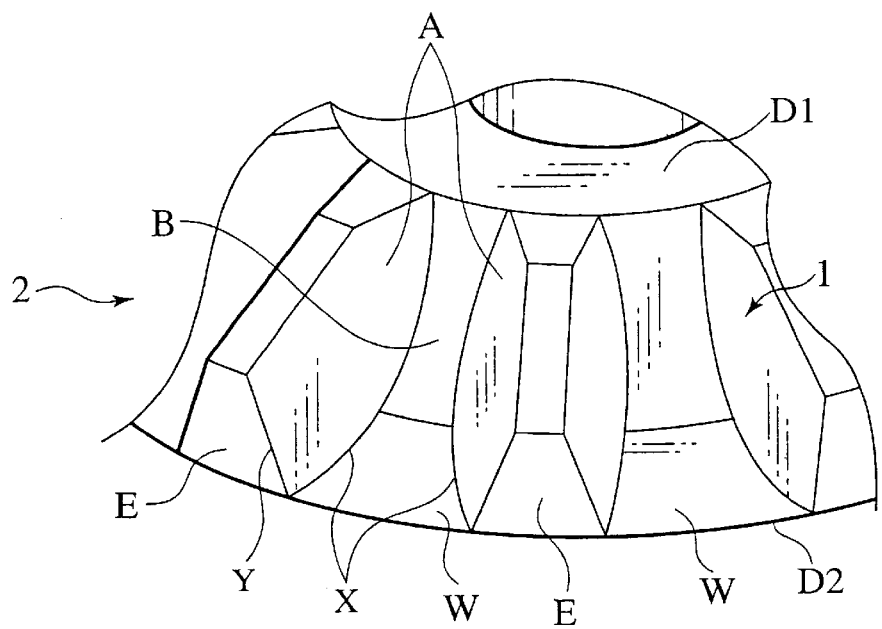
FIG. 2D is an enlarged partial view of the bevel gear according to this invention.

FIG. 2A shows a bevel gear 1 used for automotive differential gearing. Each tooth 2 is shaped to gradually increase in dimensions from a small-diameter end D1 to a large-diameter end D2. Note that a fillet curve between a tooth flank A and a bottom land B has a radius of curvature R which gradually increases from the small-diameter end D1 to the large-diameter end D2 (See FIGS. 2B and 2C). That is, a radius of curvature R2 of the fillet curve at the large-diameter end D2 is greater than a radius of curvature R1 of the fillet curve at the small-diameter end D1. The small-diameter end D1 has another radius of curvature different in value from R1. Referring to FIG. 2D, the bevel gear 1 has a web W formed at the outer edge of the bottom land B. The web W and the tooth flank A of each tooth 2 form a boundary portion X which is also in a curved shape. The boundary portion X has a radius of curvature equal to the radius of curvature R2 at the large-diameter end D2. An outer surface E of each tooth 2 and the tooth flank A form a boundary portion Y which is also formed in a curved shape. A radius of curvature of the boundary portion Y is, however, not necessarily equal to the radii of curvature R1, R2.

Figure 2E:
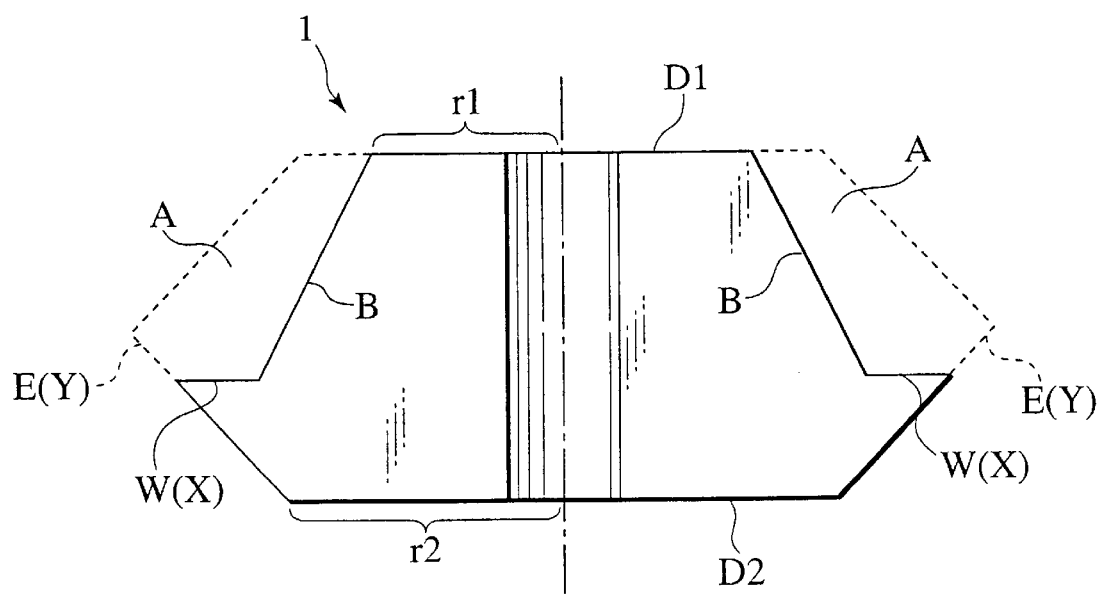
FIG. 2E is a cross-sectional view of the bevel gear according to this invention.
Figure 3A:
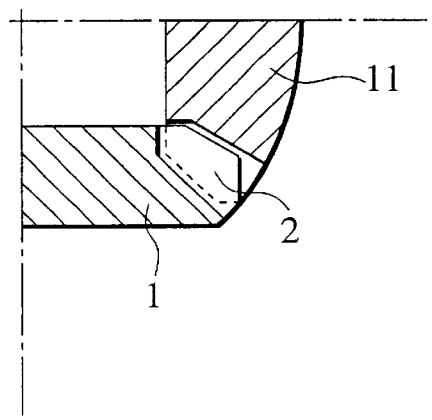
FIG. 3A is a cross-sectional view illustrating a portion of the bevel gear mating with a mating gear.
Figure 3B:
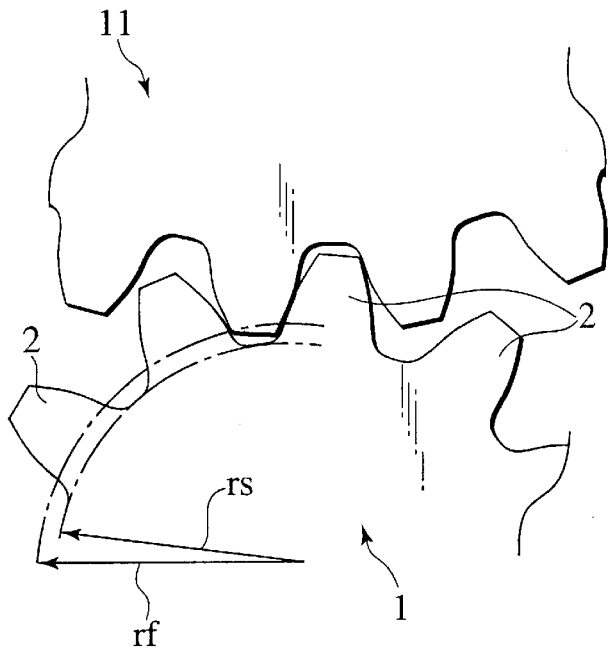
FIG. 3B is an explanatory view of the bevel gear mating with the mating gear.
Figure 3C:
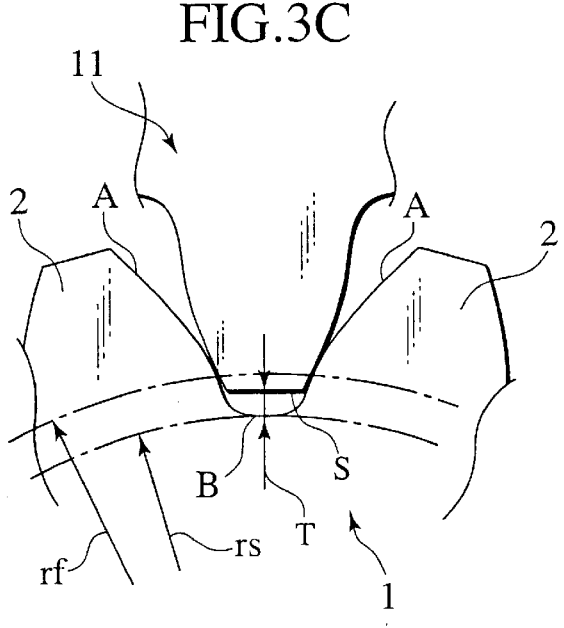
FIG. 3C is an enlarged view of a portion of the bevel gear mating with the mating gear.

A radius of curvature of a fillet curve is first determined so as to provide good meshing with a mating gear. Referring to FIGS. 3A to 3C illustrating the relation with a mating gear 11, a maximum radius of curvature Rmax is made equal in value to the difference between a minimum meshing circle radius rf with respect to the mating gear 11 and a dedendum circle radius rs (Rmax=rf−rs). The minimum meshing circle radius rf and the dedendum circle radius rs also increase from the small-diameter end D1 to the large-diameter end D2. The maximum radius of curvature Rmax thus also increases, resulting in a radius of curvature R of the fillet curve gradually increasing from the small-diameter end D1 to the large-diameter end D2. In some cases, however, where a radius of curvature R of the fillet curve is determined in order only to provide good meshing with the mating gear 11, a radius of curvature R at the large-diameter end D2 may be greater than half a width C of a tooth bottom. As a result, the bottom land is raised as shown by two-dot chain lines R3 in FIG. 2C, resulting in unsuitable shape for a bevel gear. Further, a required bottom clearance T, i.e., a gap between the bottom land B and a tooth tip S of the mating gear 11 as shown in FIG. 3C may not be obtained, which prevents smooth operation. In such a case, the radius of curvature R2 of the fillet curve is set to be smaller than the maximum radius of curvature Rmax so as to constitute a maximum single radius of curvature connecting the bottom land B and the tooth flank A to provide a tooth-bottom shape suitable for a bevel gear, as shown in FIG. 2C. Referring to FIG. 2E, r1 denotes a radius of the small-diameter end D1 and r2 denotes a radius of the large-diameter end D2. The relationship between the radii of curvature R1, R2 and r1, r2 satisfies r1:r2≧R1:R2.

More specifically, when the gear 1 is used as a pinion gear in automotive differential gearing, the radius of curvature R2 of the fillet curve at the large-diameter end D2 is made 52 percent greater than the radius of curvature R1 of the fillet curve at the small-diameter end D1. When the gear 1 is used as a side gear, the radius of curvature R2 of the fillet curve at the large-diameter end D2 is made 94 percent greater than the radius of curvature R1 of the fillet curve at the small-diameter end D1.

As described above, the bevel gear 1 in this embodiment has a fillet curve with a radius of curvature (R1, R2) gradually increasing from the small-diameter end D1 to the large-diameter end D2, and the maximum radii of curvature Rmax of the radii of curvature R1, R2 are set to be equal in value to the difference between the minimum meshing circle radius rf and the tooth dedendum circle radius rs. This increases the strength of the large-diameter end which is otherwise likely to be broken, without sacrificing the shape of the gear, providing sufficient strength from the small-diameter end D1 to the large-diameter end D2. It is possible to stepwise increase a radius of curvature of the fillet curve from the small-diameter end D1 to the large-diameter end D2. However, the gradual increase of the above embodiment is preferable because it prevents the occurrence of stress concentration and offers stable strength from the small-diameter end D1 to the large-diameter end D2. Further, the boundary portions Y, X of each tooth 2 also have curvature, providing additional stable strength.

Figure 4:
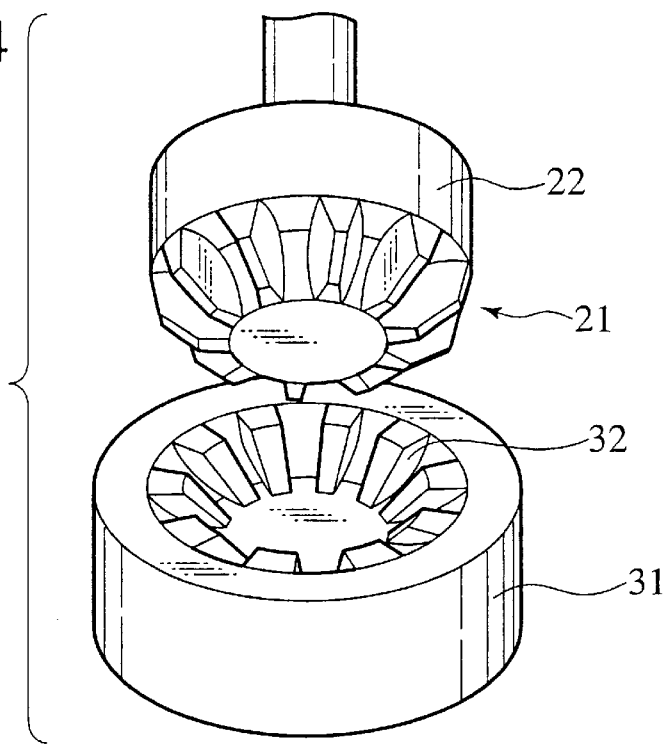
FIG. 4 is a perspective view illustrating an electrode for electric discharge machining and a forging die used in a process of manufacturing the bevel gear according to this invention.

For the manufacturing of the bevel gear 1, an electrode for electric discharge machining 21, as shown in FIG. 4, in a shape similar to that of the bevel gear 1 is produced. In an electrode production process, the bevel gear 1 with fillet curves having predetermined radii of curvature R1, R2 is engineered by three-dimensional CAD. Using the resulting thee-dimensional model, an electrode processing program is made by CAM. Next, according to the electrode processing program, an electrode material such as copper, copper-tungsten composites, or graphite is processed by a CNC machining center. During production, fillet curves with different radii of curvature may be formed with a ball end mill. The electrode 21 has a cylinder 22 extending coaxially with a radius identical to that of the large-diameter end D2.

Figure 5:
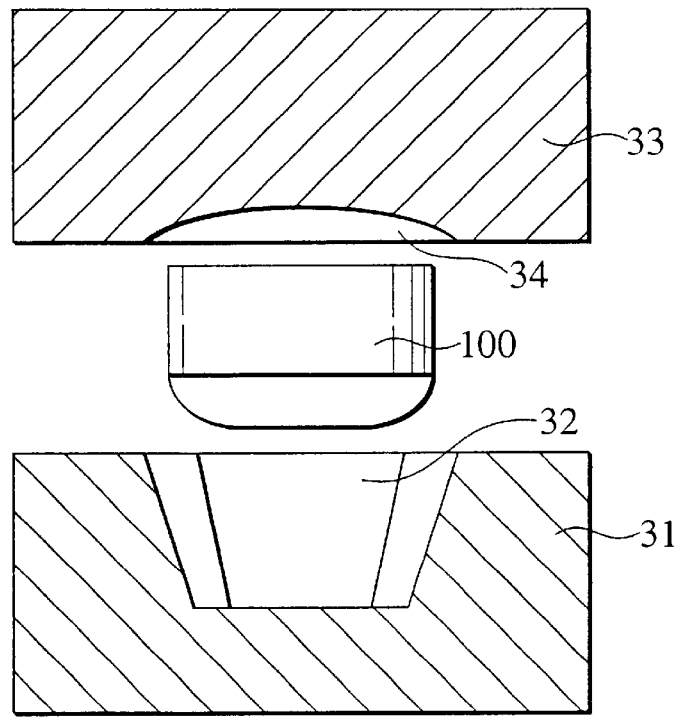
FIG. 5 is a cross-sectional view illustrating the forging of the gear material with the forging die.

Next, using the electrode 21, electric discharge machining (diemilling) is performed to a die material, producing a forging die 31 having a gear mold 32 in a reversed shape of the bevel gear 1 as shown in FIG. 4. The forging die 31 shown in FIG. 4 is the lower die. As the upper die in mating, a forging die 33 with a rear spherical surface mold 34 as shown in FIG. 5 is produced. With the upper and lower forging dies 31, 33, a gear material 100 is forged to make the bevel gear 1 as shown in FIG. 2A. Such forging may be warm or cold forging. After forging, cool sizing, finishing, and polishing may be performed as necessary. A die for sizing can also be produced by electric discharge machining.

The electrode 21 for electric discharge machining having a similar shape to that of the bevel gear 1 is thus produced, with which electrode 21 the forging die 31 having the gear mold 32 is machined, with which die 31 the bevel gear 1 is forged, whereby the bevel gear 1 is manufactured with good productivity and high precision.

The electrode 21 has the cylinder 22 extending coaxially with a radius substantially identical to that of the large-diameter end D2. Thus, if precision deteriorates due to wear, the electrode 21 can be repaired to the original tooth shape by cutting the surface slightly (by some 0.5 to 1 mm) so as to enable it to be used for a long duration. This leads to reduction in cost because the replacement of this kind of electrode made from an expensive material is avoided.

In the production process as described above, the first step is producing the electrode 21 for electric discharge machining. In an alternative production process, the bevel gear 1 with fillet curves of predetermined radii of curvature R1, R2 is engineered by three-dimensional CAD, and using the resulting three-dimensional model, a die processing program is made by CAM. Then, based on the program, a forging die 31 with a gear mold 32 having a reversed shape of the bevel gear 1 is produced by a CNC machining center. Using the die 31, the bevel gear 1 is forged. This also enables production of the bevel gear 1 with good productivity and high precision.

It may also be possible to form fillet curves of the bevel gear 1 with predetermined radii of curvature (R1, R2) using a ball end mill or a hand grinder. However, it requires very long processing time to form fillet curves in each bevel gear by a ball end mill, reducing productivity. Further, it is troublesome to form fillet curves in each bevel gear with a hand grinder, which is likely to reduce precision and result in unevenness. For the foregoing reasons, the process of this invention in which the bevel gear 1 is forged with a forging die 31 or a forging die produced with an electrode for electric discharge machining improves both productivity and precision.

The entire content of Japanese Patent Application NO. P2001-098710 with a filing date of Mar. 30, 2001 is herein incorporated by reference. Although the invention has been described above by reference to certain embodiments of the present invention, the invention is not limited to the embodiments described above and changes will occur to those skilled in the art, in light of the teachings. The scope of the invention is defined with reference to the following claims.

What is claimed is:

1. A bevel gear comprising a plurality of teeth each having a tooth flank, the tooth flank being connected with a bottom land via a fillet curve having a radius of curvature, and a large-diameter end and a small-diameter end, wherein the radius of curvature of the fillet curve at the large-diameter end is greater than the radius of curvature at the small-diameter end, wherein a maximum radius of curvature of the fillet curve is equal in value to the difference between a minimum meshing circle radius with respect to a mating gear and a dedendum circle radius.

2. A bevel gear according to 1, wherein the radius of curvature of the fillet curve between the tooth flank and the bottom land gradually increases from the small-diameter end to the large-diameter end.

3. A bevel gear according to 1, further comprising a web provided at the outer edge of the bottom land, extending between the opposing tooth flanks.

4. A bevel gear according to 1, wherein:
   the small-diameter end is shaped to have two different radii of curvature; and
   the large-diameter end is shaped to have a single radius of curvature.

5. A bevel gear according to 1, wherein a boundary portion between the tooth flank and an outer surface of the tooth is shaped to have a radius of curvature.

6. A bevel gear according to 1, prepared by a process comprising:
   preparing a forging die with a gear mold in a reversed shape of the bevel gear; and
   forging the bevel gear with the forging die.

7. A bevel gear according to 6, prepared by a process further comprising:
   preparing an electrode for electric discharge machining having a shape similar to that of the bevel gear; and
   producing a forging die with a gear mold in a reversed shape of the bevel gear, using the electrode.

8. A bevel gear according to 7, wherein the electrode for electric discharge machining is provided with a cylinder extending coaxially with a radius substantially identical to that of the large-diameter end.

9. A bevel gear comprising a plurality of teeth each having a tooth flank, the tooth flank being connected with a bottom land via a fillet curve having a radius of curvature, and a large-diameter end and a small-diameter end, wherein the radius of curvature of the fillet curve at the large-diameter end is greater than the radius of curvature at the small-diameter end, and further comprising a web provided at the outer edge of the bottom land, extending between the opposing tooth flanks wherein a boundary portion between the tooth flank and the web is shaped to have curvature with a radius of curvature equal to the radius of curvature of the large-diameter end.

* * * * *